United States Patent [19]

Robinson

[11] Patent Number: 4,667,473

[45] Date of Patent: May 26, 1987

[54] LOW COMPENSATING ACCUMULATOR AND BUNGEE

[76] Inventor: Curtiss W. Robinson, 13422 40th Ave. S., Seattle, Wash. 98168

[21] Appl. No.: 535,976

[22] Filed: Sep. 26, 1983

[51] Int. Cl.⁴ .......... F16D 31/02

[52] U.S. Cl. .......... 60/415; 138/31; 91/519; 92/152

[58] Field of Search .......... 92/152, 134, 117 A; 91/519; 60/415, 583, 593; 138/31

[56] References Cited

U.S. PATENT DOCUMENTS

| | | | |
|---|---|---|---|
| 2,298,611 | 10/1942 | Bruderlin | 244/75 |
| 2,417,256 | 3/1947 | Kremiller | 138/31 |
| 2,745,357 | 5/1956 | Strayer | 138/31 |
| 2,937,663 | 5/1960 | Ashton et al. | 138/31 |
| 2,943,642 | 7/1960 | Westcott, Jr. | 138/31 |
| 3,336,948 | 8/1967 | Lucien | 138/31 |
| 3,669,151 | 6/1972 | Fleming | 138/31 |
| 3,907,001 | 9/1975 | Vanderlaan et al. | 138/31 |
| 4,174,656 | 11/1979 | Duffey | 92/134 |
| 4,187,682 | 2/1980 | Shen | 60/413 |

FOREIGN PATENT DOCUMENTS

| | | | |
|---|---|---|---|
| 485617 | 5/1938 | United Kingdom | 92/134 |

*Primary Examiner*—Larry I. Schwartz
*Attorney, Agent, or Firm*—Delbert J. Barnard

[57] ABSTRACT

In an actuator (102), a piston head portion (108) reciprocates in a large diameter section of a cylinder casing (102), dividing such section into first and second variable volume chambers (112, 116). An end portion (104) projects outwardly of the cylinder casing (102) and includes a mounting (162) at its end. The opposite end portion (106) extends into a third variable volume chamber (120). A piston head portion (82) reciprocates in a piston section (72) of a volumetric compensator (14). One end portion of piston (80) is slidably received within first variable volume chamber (90). The opposite end portion (86) of the piston (80) extends through a central opening in a diverter wall (88) between the piston section (72) and a gas charge section (78). Pressurized gas within the gas charge section (78) acts on the second end (86) of the piston (80), forcing hydraulic fluid in chamber (90) to chamber (120) of actuator (102). The gas pressure in chamber (116) and the hydraulic fluid pressure in chamber (120) both exert a force between the actuator piston and cylinder casing tending to extend or elongate the actuator (102). Variable volume chamber (100) of the compensator (14) and variable volume chamber (112) of the actuator are interconnected and fluid is transferred back and forth between them during movements of the compensator and actuator pistons.

16 Claims, 2 Drawing Figures

LOW COMPENSATING ACCUMULATOR AND BUNGEE

Figure 1:
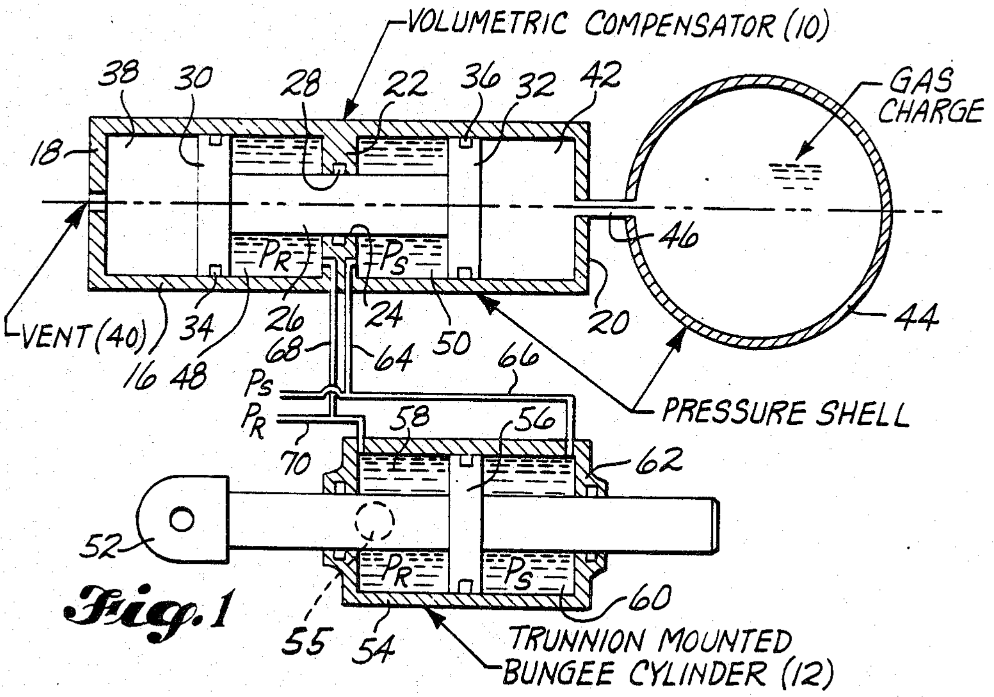

The present invention relates to double acting piston type accumulators and to fluid power systems utilizing such accumulators. More particularly, it relates to the provision of a double acting piston type accumulator and a fluid actuator, together adapted to provide a maximum force level in the fluid actuator with minimum displacement of hydraulic fluid.

The application is a companion to a first copending application Ser. No. 536,040, filed Sept. 26, 1983, now U.S. Pat. No. 4,595,158, and entitled Aircraft Control Surface Actuation And Counterbalancing, and a second copending application Ser. No. 535,980, filed Sept. 26, 1983, now U.S. Pat. No. 4,602,481, and entitled Fluid Actuator For Binary Selection Of Output Force. The contents of these applications is hereby expressly incorporated by reference into this application.

The first of these applications relates to the concept of using a first hydraulic device or actuator, therein and herein termed a "bungee", in a passive mode to resist the steady-state component of the aerodynamic or gravity load acting on an aircraft control surface, and a small servoactuator of a conventional type in an active mode for positioning the control surface. In accordance with a basic aspect of that invention, a counterbalancing hydraulic actuator or bungee is connected between a frame portion of the aircraft and a flight control surface and is oriented to impose a counterbalancing torque on the flight control surface acting in opposition to the torque imposed by the aerodynamic load. The concept includes the use and arrangement of both constant force and variable force type hydraulic actuators to perform the counterbalancing function. My second copending application Ser. No. 535,980, relates to the provision of a unique and improved variable force hydraulic actuator.

The contents of both of these copending applications are hereby expressly incorporated into the present application by this specific reference to them.

Bungee aided hydraulic control actuating systems may require that hydraulic flow be supplied by accumulators in order to support transient bungee motion without increasing transient flows in the pressure and return lines of the hydraulic distribution system. A double acting piston type accumulator is required to exchange high and low pressure fluid with a bungee actuator in order to prevent transient pumping of flows in the aircraft distribution lines. This piston type accumulator would normally have a high pressure cylinder section and a gas reservoir, each stressed to contain fluid at the maximum system pressure.

Double acting volume compensated accumulators have been used before for remote storage of hydraulic/-pneumatic energy. An accumulator of this type is built by Parker Hannifin for use in the jet fuel starter system of the F-15 airplane. A unit of this type could be used to supply transient flows to a control surface actuator. However, this combination of accumulator and actuator would be unnecessarily heavy due to the large volume of liquid and containment vessels needed to support a given level of actuator force.

The accumulator of the present invention provides a maximum force level with a minimum displacement of hydraulic fluid. This result is accomplished by using approximately equal area gas and oil driven pistons in the actuator element. Dynamic seals between gas charge and return pressure areas are arranged with a pressurized section between two sealing elements. This insures a near zero differential pressure between oil-to-gas sealing elements. The comparitive weight of actuators and accumulators of the present invention and presently known actuators and accumulators is closely tied to the volume of oil which must be displaced by a unit of each type during one full stroke or cycle of the actuator element. The displaced oil volume in a configuration constructed in accordance with the present invention is about one-half that of a system composed of known actuator and accumulator designs. The resulting weight advantage of the configuration of the invention stems from a smaller diameter of the pressurized cylindrical shelves of both the actuator and accumulator which are necessary to produce equal actuator force output in either of the configurations.

Figure 2:
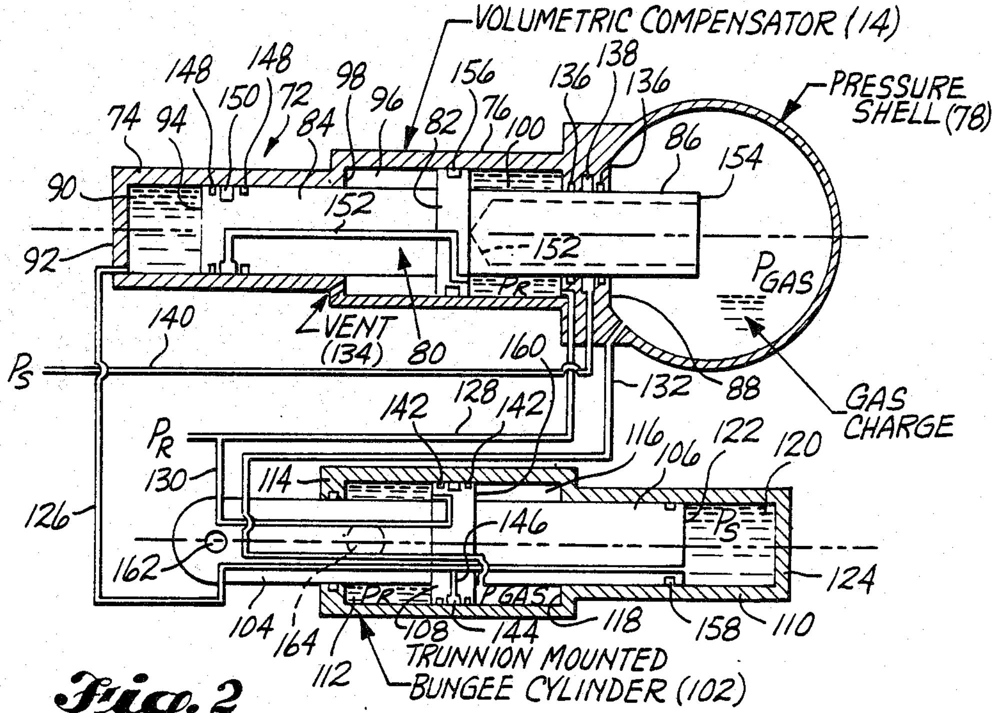

Referring to the drawings,

FIG. 1 is a system view of a linear fluid actuator of a conventional construction and a known volumetric compensator or accumulator; and FIG. 2 is a view like FIG. 1, but of a new actuator and a new volumetric compensator, both incorporating features of the present invention.

FIG. 1 shows a double acting accumulator or volumetric compensator 10 of a conventional type connected to hydraulic bungee 12. A superior volumetric compensator 14, embodying the present invention, is shown by FIG. 2. It is adapted to provide a maximum bungee force level with a minimum displacement of hydraulic fluid. This result is accomplished by using approximately equal area gas and oil driven pistons in the bungee element. Dynamic seals between gas charge and return pressure areas are arranged with a pressurized section between two sealing elements. This ensures a near zero differential pressure between oil-to-gas sealing elements.

The weight advantage of the compensator 14 shown by FIG. 2 can be seen in terms of a comparison of the liquid volumes of the two configurations. Compensators 10 and 14 are scaled to produce the same bungee force and stroke.

The comparative weights of bungees and accumulators of the types shown in FIGS. 1 and 2 is closely tied to the volume of oil which must be displaced by a unit of each type during one full stroke or cycle of the bungee element. The cross hatched areas in FIGS. 1 and 2 show the volume of hydraulic oil contained in each unit. This displaced oil volume, in the case of compensator 14, is about one-half that of the displaced oil volume in compensator 10. The resulting weight advantage of compensator 14 stems from the smaller diameter of the pressurized cylindrical shells of both bungee and accumulator which are necessary to produce equal bungee force output in either of the illustrated systems.

The compensators 10, 14 will now be described in greater detail.

Compensator 10 comprises a cylindrical housing 16 having opposite end walls 18, 20 and a center wall 22. Wall 22 includes a central opening 24 in which a piston rod 26 is slidably received. A seal 28 is provided for sealing between the wall of opening 24 and the rod 26. Piston heads 30, 32 are provided at the opposite ends of rod 26. Piston heads 30, 32 carry peripheral seals 34, 36 which seal between the piston heads 30, 32 and the inner wall of the casing 16.

A first variable volume chamber 38 is formed within housing 16 between piston head 30 and wall 18. This chamber 38 is vented to the atmosphere via a vent opening 40. An identical chamber 42 is defined at the opposite end of housing 16, between piston head 32 and end wall 20. This chamber 42 is in communication with a gas charge in a gas storage tank 44 via a connecting passageway 46. A third chamber 48 is defined between piston head 30 and center wall 22 and a fourth chamber 50 is defined between center wall 22 and piston head 32.

As described in detail in my aforementioned copending application Ser. No. 536,040, the rod end 52 of bungee 12 is pivotally attached to a grounded mounting structure. The bungee casing 54 is connected to a control surface, such as by a pair of trunnions and a trunnion engaging structure (not shown) connected to the control surface in which the trunnions are received. The location of the trunnions is shown by a phantom line 55 in FIG. 1.

A piston 56 within casing 54 divides the interior of the casing 54 into chambers 58 and 60. A higher pressure in chamber 60 would make the actuator 12 tend to elongate itself. In the system that is the subject matter of my aforementioned application Ser. No. 536,040, chamber 60 is always in communication with system pressure $P_S$ and chamber 58 is always in communication with return pressure $P_R$. As a result, there is always a higher pressure in chamber 60 exerting a force on wall 62.

Chamber 50 of compensator 12 and chamber 60 of bungee 12 are connected to system supply pressure via conduits 64, 66. Chamber 48 of compensator 10 and chamber 58 of bungee 12 are connected to system return pressure via conduits 68, 70. Compensator chamber 42 and reservoir 44 contain fluid which is at the maximum system pressure.

Referring now to FIG. 2, compensator 14 comprises a stepped housing 72 having a first diameter end section 74 and a larger diameter center section 76. A gas charge reservoir 78 is attached to section 76 and forms the second end of the compensator 14. The compensator 14 contains a piston 80 having a central portion 82 and a pair of oppositely projecting end portions 84, 86. Central portion 82 has a diameter matching the inside diameter of casing section 76.

Piston section 84 has a diameter corresponding to the inside diameter of casing section 74. Piston section 86 has an outside diameter equal to the diameter of piston section 84. Piston section 86 extends through a central opening formed in a wall 88 constituting the inner boundary of the gas charge reservoir 78.

A first chamber 90 is defined between end wall 92 of casing 72 and end surface 94 of piston section 84. A second chamber 96 is defined between piston element 82 and a radial surface 98 formed where the casing 72 changes diameter. A third chamber 100 is formed between piston element 82 and wall 88.

In the system shown by FIG. 2, the bungee cylinder 102 comprises a piston having equal diameter end portions 104, 106 and a larger diameter center portion 108. Piston portion 108 has an outside diameter matching the inside diameter of the larger diameter section 102 of a stepped casing. Piston end portion 106 has an outside diameter matching the inside diameter of the smaller casing section 110. A first chamber 112 is defined between piston member 108 and end wall 114 of the casing. A second chamber 116 is defined between piston member 108 and radial surface 118 formed where the casing changes diameter. A third chamber 120 is defined between end surface 122 of piston member 106 and end wall 124 of the casing. Compensator chamber 90 corresponds to bungee chamber 120 and they are connected by a conduit 126, a portion of which extends through the bungee piston. Compensator chamber 100 corresponds to bungee chamber 112 and they are connected together and to the system return pressure by conduits 128, 130. A portion of conduit 130 is formed in the piston body. Bungee chamber 116 is connected to the gas charge by a conduit 132. Compensator chamber 96 is vented to the atmosphere via a vent opening 134.

As explained in Ser. No. 536,040, the systems of FIGS. 1 and 2 operate in a power-recoverable mode. The stored gas charge energy is used for extending the bungee 12, 102. The bungee force counterbalances the aerodynamic forces acting on a deployed flight control surface. The kinetic energy of the aerodynamic forces which rotate the flight control surface from a deployed position back to a neutral or trim position is converted to stored energy. Return movement of the flight control surface contracts the bungee 12, 102 and when this happens, high pressure fluid in chamber 60 of bungee 12 (chambers 116, 120 of bungee 102) is forced by the surface movement back into the compensator 10 or 14. The compensator 10, high pressure hydraulic fluid from bungee cylinder chamber 60 is transferred to compensator cylinder chamber 50. This causes a shift in position of the piston 26 in the direction of chamber 42. The gas in chamber 42 is compressed and energy storage is realized in the form of increased pressure in chamber 42, 44. This same thing happens in the system of FIG. 2, but in addition gas pressure is transferred from bungee cylinder chamber 116 back to the gas charge reservoir 78.

Dynamic seals are provided between the gas charge and return pressure areas of the bungee 102 and the compensator 14 in the system shown in FIG. 2. Specifically, in compensator 14, a pair of seal elements 136 are carried by the portion of wall 88 which surrounds piston section 86. Seal elements 136 are axially spaced apart and an annular chamber 138 is provided between them. System supply pressure $P_S$ is communicated to chamber 138 via a conduit 140. In similar fashion, piston section 108 of bungee cylinder 102 is provided with a pair of axially spaced apart seal elements 142 and an annular fluid chamber 144 is located between seal elements 142. System supply pressure $P_S$ is communicated with chamber 144 via passage 146 leading from conduit 126. The presence of high pressure in the chambers 138, 144 insures a near zero differential pressure between the oil-to-gas sealing elements.

A pair of seal elements 148 are carried by piston section 84. These seal elements are axially spaced apart and an annular chamber 150 is provided between them. Chamber 150 is connected to chamber 100 by a passageway 152.

The second end portion 86 of piston 80 is tubular in form. It includes a cylindrical sidewall and an inner surface 152 which together with the radial end surface 154 provide a pressure face towards the gas charge within the gas charge section 78 which is equal in area to the area of the piston end surface 94.

The central portion 82 of piston 80 carries a seal ring 156 which makes sealing engagement with the cylindrical inner surface of piston casing section 76. In similar fashion, the end portion 106 of the actuator piston carries a seal ring 158 which makes sealing engagement with a cylindrical inner surface of the cylinder section 110.

Actuator piston 108 includes a side face 160 which forms one of the axial boundaries of chamber 116. Chamber 116 is connected to the gas charge via passageway 132. Hence, the pressure in chamber 116 is always tending to elongate the actuator. The gas pressure acting on surfaces 152, 154 loads the piston 80 against the body of fluid within chamber 90. This pressure is transmitted by the fluid through passageway 126 to the body of hydraulic fluid within chamber 120. Thus, a pressure exists within chamber 120 tending to elongate the actuator 102. The pressure within chambers 100 and 112 is at return pressure and for this reason is passive and does not tend to influence movement of either piston. When the volume of chamber 100 is decreasing, the volume of chamber 112 is increasing and fluid is being transferred from chamber 100 into chamber 112. When the volume of chamber 112 is decreasing, the volume of chamber 100 is increasing and fluid is transferred from chamber 112 into chamber 100.

In the same fashion as described above in connection with FIG. 1, the outer end portion of the actuator piston is pivotally attached at 162 to a first support (e.g. a fixed frame portion of a wing) and the cylinder body is pivotally attached by trunnions 164 to a second support (e.g. a movable control surface). When the apparatus shown by FIG. 2 is used in a system of the type described in my first aforementioned application Ser. No., and the pivot points 162, 164 are aligned with the pivot axis of the control surface, the actuator 102 does not influence angular movement of the control surface because of the alignment of the pivot axis. However, when the control surface is moved to place the axis 162, 164 out of alignment with its pivot axis, the pressure in chambers 116, 120 provides a constant force tending to elongate the actuator 102. This force acts on a moment arm and produces a moment tending to counterbalance the aerodynamic forces acting on the control surface.

The apparatus shown by FIG. 2 provides a maximum force level with a minimum displacement of hydraulic fluid. This result is accomplished by the use of approximately equal area gas and oil driven pistons, e.g. surface 160 is approximately equal in area to surface 122.

The comparitive weight of the actuators and the accumulators of the type shown in FIGS. 1 and 2 is closely tied to the volume of oil which must be displaced by a unit of each type during full stroke or cycle of the actuator element. The cross hatched area in FIGS. 1 and 2 shows the volume of hydraulic oil contained in each unit. The displaced oil volume, in the case of FIG. 2, is seen to be about one-half that of the case illustrated in FIG. 1. The resulting weight advantage of the FIG. 2 configuration stems from the smaller diameter of the pressurized cylindrical shelves of both the actuator and the accumulator.

The invention and its attendant advantages will be understood from the foregoing description and it will be apparent that various changes may be made in the form, construction, and the arrangement of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

What is claimed is:

1. A double acting piston type accumulator comprising:

a casing comprising a piston section and a gas charge section separated by a divider wall, said piston section comprising an elongated first diameter portion and an elongated larger diameter portion between said first diameter portion and the divider wall, said divider wall including an opening of the same diameter as the first diameter portion of the piston section;

a piston within said casing comprising first and second end portions, said first end portion slidably received in the first diameter portion of the piston section, said second end portion being slidably received within the opening in the divider wall, and having an end in said gas charge section, said piston also including a larger diameter center portion which is slidably received within the larger diameter portion of the piston section of the casing, a first variable volume chamber defined in the first diameter portion of the piston section endwise outwardly of the first end portion of the piston, a second variable volume chamber formed in the large diameter portion of the piston section between the center portion of the piston and a radial surface defined where the first diameter portion of the casing meets the larger diameter portion, a third variable volume chamber defined between the center portion of the piston and the divider wall, said first chamber being connected to hydraulic fluid at supply pressure during use, said second chamber being vented to the atmosphere during use, said third chamber being connected to hydraulic fluid at return pressure during use, and said gas charge section containing a pressurized gas charge acting on the end surface of the second end portion of said piston.

2. An accumulator according to claim 1, wherein a first end portion of the piston carries a pair of axially spaced apart seal rings making sealing engagement with an inner surface of the first diameter portion of the piston section, and an annular fluid chamber is positioned between said seals and in communication with hydraulic fluid at return pressure.

3. An accumulator according to claim 2, comprising passageway means in said piston innerconnecting said annular chamber and said third variable volume chamber.

4. An accumulator according to claim 1, wherein said opening in the divider wall comprises a cylindrical sidewall portion which carries a pair of axially spaced apart seal rings which seal against an outer surface of the second end portion of the piston, and an annular fluid chamber is defined between said seal rings and is connected to hydraulic fluid at supply pressure.

5. An accumulator according to claim 4, wherein a first end portion of the piston carries a pair of axially spaced apart seal rings making sealing engagement with an inner surface of the first diameter portion of the piston section, and an annular fluid chamber positioned between said seals and in communication with hydraulic fluid at return pressure.

6. An accumulator according to claim 5, comprising passageway means in said piston innerconnecting said annular chamber and said third variable volume chamber.

7. An accumulator according to claim 1, wherein the second end portion of the piston is tubular and includes a pressure face spaced axially inwardly from the end of the second end portion of the piston.

8. In combination, a linear fluid actuator and a double acting piston type accumulator, said actuator comprising a piston and a cylinder which together define a first variable volume chamber and a second variable volume chamber which expand and contract together and expand when the actuator is extending, and a third variable volume chamber which contracts when the actuator is extending;

said accumulator comprising a casing having a piston section and a gas charge section separated by a divider wall having a central opening, and a piston therein which includes an end portion which extends through said central opening and presents a pressure face to the interior of the gas charge section, said piston and said piston section of the casing defining a first variable volume chamber and a second variable volume chamber, with movement of the piston towards the gas charge chamber causing an increase in volume of the first variable volume chamber and a decrease in volume of the second variable volume chamber, and a movement of the piston in the opposite direction causing a decrease in volume of the first variable volume chamber and an increase in the volume of the second variable volume chamber;

first passageway means interconnecting the first variable volume chamber of the accumulator and the third variable chamber of the actuator, said chambers and said passageway means containing a hydraulic fluid;

second passageway means interconnecting the second variable volume chamber of the accumulator and the first variable volume chamber of the actuator, said chambers and said passageway means containing hydraulic fluid at a return pressure;

third passageway means interconnecting the interior of the gas charge section and the second variable volume chamber of the actuator, said gas charge section, said second actuator chamber and said passageway means containing a pressurized gas stressed at a predetermined high pressure.

9. A combination according to claim 8, wherein the portion of the accumulator piston which travels in the first variable volume chamber in the accumulator carries a pair of axially spaced apart seal rings making sealing engagement with a cylindrical side surface of the piston section of the accumulator casing, and an annular fluid chamber is positioned between within said seal rings and is in communication with hydraulic fluid at return pressure.

10. A combination according to claim 9, comprising passageway means in said piston interconnecting said annuular chamber and said second variable volume chamber in the accumulator.

11. A combination according to claim 8, wherein said opening in the divider wall comprises a cylindrical sidewall portion which carries a pair of axially spaced apart seal rings which seal against an outer surface of the portion of the accumulator piston which extends through said opening, and an annular fluid chamber is defined between said seal rings and is connected to hydraulic fluid at high pressure.

12. A combination according to claim 10, wherein the portion of the accumulator piston which travels in the first variable volume chamber in the accumulator carries a pair of axially spaced apart seal rings making sealing engagement with a cylindrical side surface of the piston chamber is positioned between said seal rings and is in communication with hydraulic fluid at return pressure.

13. A combination according to claim 12, comprising passageway means in said piston interconnecting said annular chamber and said second variable volume chamber in the accumulator.

14. A combination according to claim 8, wherein the end portion of the accumulator piston which extends into the interior of the gas charge section is tubular and the pressure face is divided between a surface inside of said second end portion and an annular end surface of said second end portion.

15. A combination according to claim 8, wherein the actuator piston includes a portion bordering the first variable volume chamber in said actuator which carries a pair of axially spaced apart seal rings making seal engagement with a cylindrical inner surface portion of the actuator cylinder, and an annular chamber between said seal rings which is connected with hydraulic fluid at elevated pressure.

16. In combination, a linear fluid actuator and a double acting piston type accumulator, said actuator comprising a piston and a cylinder, said cylinder comprising first and second end portions, said first end portion having an inside diameter which is larger than the inside diameter of the second portion, said first end portion of said cylinder having an outer end wall including a central opening and an annular inner surface surrounding said opening, an equal area annular inner surface formed at a shoulder where said first end portion of said cylinder is joined to the second end portion of the cylinder, said second end portion of the cylinder having a closed outer end including an inner surface, said piston having a central portion with an outside diameter corresponding to the inside diameter of the first portion of the cylinder, a first end portion which extends axially outwardly from said central portion through the opening in the end wall of the first portion of the cylinder, and a second end portion which extends endwise from the central portion of the piston in the opposite direction, into the interior of the second end portion of the cylinder, said first end portion of the piston being adapted to be attached to a first support, said cylinder being adapted to be attached to a second support, a first variable volume chamber being defined axially between the annular inner surface which surrounds the opening in the outer end wall of the first end portion of the cylinder and an opposing annular side face on the central portion of the piston, a second variable volume chamber being defined axially between an annular opposite side face on the central portion of the piston and the annular surface at the shoulder where the first end portion of the cylinder is connected to the second end portion of the cylinder, and a third variable volume chamber being defined axially between an end surface on the second end portion of the piston and the inner surface of the end wall of the second section of the cylinder;

said accumulator comprising a casing comprising a piston section and a gas charge section separated by a divider wall, said piston section comprising an elongated first diameter portion and an elongated larger diameter portion between said first diameter portion and the divider wall, said divider wall including an opening of the same diameter as the first diameter portion of the piston section;

a piston within said casing comprising first and second end portions, said first end portion being slidably received in the first diameter portion of the piston section, said second end portion being slidably received within the opening in the divider wall, and having an end in said gas charge section, said piston also including a larger diameter center portion which is slidably received within the larger diameter portion of the piston section of the casing, a first variable volume chamber defined in the first diameter portion of the piston section endwise outwardly of the first end portion of the piston, a second variable volume chamber formed in the large diameter portion of the piston section between the center portion of the piston and a radial surface defined where the first diameter portion of the casing meets the larger diameter portion, a third variable volume chamber defined between the center portion of the piston and the divider wall, said second chamber being vented to the atmosphere during use, said third chamber being connected to hydraulic fluid at return pressure during use, said gas charge section containing a pressurized gas charge acting on the end surface of the second end portion and said piston, first passageway means interconnecting the third variable volume chamber of the actuator and the first variable volume chamber of the accumulator, second passageway means interconnecting the second variable volume chamber of the actuator and the gas charge section of the accumulator;

third passageway means interconnecting the first variable volume chamber of the actuator and the third variable volume chamber of the accumulator, and connecting such chambers with hydraulic fluid at return pressure, said gas charged section of the accumulator containing a pressurized gas which is stressed to a predetermined maximum supply pressure, and said third variable volume chamber of said actuator and said first variable volume chamber of the accumulator containing hydraulic fluid under pressure.

* * * * *

UNITED STATES PATENT AND TRADEMARK OFFICE
CERTIFICATE OF CORRECTION

PATENT NO. : 4,667,473

DATED : May 26, 1987

INVENTOR(S) : Curtiss W. Robinson

It is certified that error appears in the above–identified patent and that said Letters Patent are hereby corrected as shown below:

Column 1, line 12, "The" should be -- This --.

Column 4, line 36, "in" should be -- by --.

Column 5, line 27, after "Ser. No.", insert -- 536,040 --.

Column 5, line 44, "comparitive" should be -- comparative --.

Claim 12, column 8, line 6, after "piston", insert -- section of the accumulator casing, and an annular fluid --

Claim 15, col. 8, line 22, "seal" should be -- sealing --.

Signed and Sealed this

Twelfth Day of April, 1988

*Attest:*

DONALD J. QUIGG

*Attesting Officer*

*Commissioner of Patents and Trademarks*